United States Patent
Bai et al.

[11] Patent Number: 5,913,916
[45] Date of Patent: Jun. 22, 1999

[54] FUZZY LOGIC SHIFT SCHEDULING FOR AUTOMATIC TRANSMISSIONS

[75] Inventors: Shushan Bai, Plainfield; Phillip Franklin Mc Cauley; Scott Mc Clellan Thompson, both of Zionsville; Timothy Alan Robinson, Indianapolis, all of Ind.

[73] Assignee: General Motors Corporation, Detroit, Mich.

[21] Appl. No.: 07/945,786

[22] Filed: Sep. 16, 1992

[51] Int. Cl.$^6$ .................................................. G06G 7/70
[52] U.S. Cl. ............................... 701/59; 701/57; 701/58; 701/51; 477/131; 477/143; 706/900
[58] Field of Search ........................... 364/424.1, 426.04, 364/424.01, 426.01; 74/866, 859, 867, 868; 192/3.31, 3.3; 701/51, 57, 58, 59; 477/121, 153, 154, 131, 143, 155; 706/900

[56] References Cited

U.S. PATENT DOCUMENTS

| | | | |
|---|---|---|---|
| 4,618,038 | 10/1986 | Ogasawara et al. | 192/3.29 |
| 4,841,815 | 6/1989 | Takahashi | 701/57 |
| 4,852,006 | 7/1989 | Sperenza | 701/55 |
| 4,909,103 | 3/1990 | Morimoto | 477/38 |
| 5,019,979 | 5/1991 | Takahashi | 701/57 |
| 5,036,730 | 8/1991 | Sakai et al. | 701/57 |
| 5,079,704 | 1/1992 | Sakai et al. | 701/57 |
| 5,095,435 | 3/1992 | Tokoro et al. | 701/57 |
| 5,124,916 | 6/1992 | Tokoro et al. | 701/57 |
| 5,125,294 | 6/1992 | Takahashi et al. | 701/51 |
| 5,148,721 | 9/1992 | Anan et al. | 701/53 |

*Primary Examiner*—Jacques H. Louis-Jacques
*Attorney, Agent, or Firm*—Michael J. Bridges

[57] ABSTRACT

Transmission output speed and engine throttle position are inputs to a control which determines acceleration and input speed. Fuzzy logic has acceleration and throttle membership functions and a set of upshift and downshift values, and rules for weighting each of the values in accordance with the degree of membership of acceleration and throttle position in certain of the functions to determine a downshift point and an upshift point. The input speed is compared to the shift points to decide whether to order a shift. Two or more sets of shift values are stored and are selectable for different performance options. The shift values are stated in terms of a percentage of engine governed speed to allow different engines to be coupled to the transmission. Lockup clutch apply and release logic controls converter lockup to maintain converter mode when significant torque multiplication is occurring and generally to maintain lockup mode when the transmission range is at or above the lowest allowable lockup range.

5 Claims, 8 Drawing Sheets

| RANGE | CLUTCHES APPLIED | | | | |
|---|---|---|---|---|---|
| | C1 | C2 | C3 | C4 | C5 |
| FWD 1 | X | | | | X |
| 2 | X | | | X | |
| 3 | X | | X | | |
| 4 | X | X | | | |
| 5 | | X | X | | |
| 6 | | X | | X | |
| REV 1 | | | X | | X |

FUZZY LOGIC SHIFT SCHEDULING FOR AUTOMATIC TRANSMISSIONS

FIELD OF THE INVENTION

This invention relates to a control for automatic transmissions, and more particularly, to method and apparatus for shift scheduling using fuzzy logic.

BACKGROUND OF THE INVENTION

The typical conventional shift scheduling system for an automatic transmission calculates the shift points and gear ratio that the transmission should be operated based upon the throttle opening of the engine and the output speed of the transmission. However, the vehicle loads, external resistances, driver's intentions (such as quick acceleration or moderate acceleration) and driving environment, etc., should also be taken into consideration to calculate the shift point and proper gear ratios in order to achieve desired vehicle performance.

In the case of transmissions which are used on vehicles having a wide variety of weights and with engines having a wide variety of governed speeds, it is important that the transmission control be sufficiently flexible to operate efficiently in each application with only minor programming changes to accommodate its environment. Another desirable aspect of flexibility is the ability to vary the shift schedule by driver control to obtain a desired economy or performance mode.

To more fully address the many influences on the vehicle performance, it is proposed to use a shift scheduling system based on the theory of fuzzy logic. In general, it is already known to use fuzzy logic techniques for transmission control. For example, U.S. Pat. No. 4,841,815 to Takahashi issued Jun. 17, 1989, uses a number of inputs, such as vehicle speed, engine load, running resistance and gear position to determine the degrees of fuzziness or the adequacy of the current gear position, the upshift gear position and the downshift gear position, thereby determining whether a shift is desirable.

It is preferable in certain applications, however, to base an evaluation of relative performance on the turbine speed of the transmission in order to determine the optimum shift point to maintain the turbine speed in the proper range, as defined by the engine governed speed, without regard for the current gear position. This allows the transmission to be used with engines of widely different governed speeds without special calibration other than inputting the governed speed. Decisions about lockup clutch control, on the other hand, may profitably take into account the gear position as well as a shift parameter determined through fuzzy logic.

SUMMARY OF THE INVENTION

The present invention is directed to an improved fuzzy logic control which interprets speed and throttle position inputs to determine the transmission shift points and issues shift commands based on a comparison of the transmission turbine speed to the shift points. An improved fuzzy logic control of a torque converter lockup clutch is also included.

In general, the transmission control incorporates a microprocessor-based computer programmed with fuzzy logic rules and membership functions to determine transmission shift points, a shift logic module to issue upshift and downshift signals upon comparing current turbine speed with the shift points, and a control module for executing the necessary clutch operations for the desired range shift. Shift points are calculated as a function of the engine governed speed, so that the control is adapted to a different engine by inputting its governed speed. Also, alternate sets of shift point values are stored in the control and are selectable by the driver for the preferred economy or performance mode. In addition, converter clutch lockup is controlled to apply and release when appropriate, based on whether the converter is in a torque multiplication mode or the transmission is in a range where lockup is allowed.

An inference engine is employed to determine shift points based on programmed membership functions and rules and two input parameters. The fuzzy logic includes membership functions which assign a degree of membership, between 0 and 1, to a parameter depending on its value within a range of values. For example, a zero throttle position function has a value of 1 at 0% throttle opening and decreases linearly to 0 at 25% opening. Thus, if the throttle opening is 12.5%, it is said to have a degree of membership of 0.5.

Four throttle opening membership functions are defined, zero, medium, large and very large, covering overlapping ranges so that throttle opening can have memberships in two membership functions. Turbine acceleration (derived from transmission output speed) is provided with a zero membership function, two negative acceleration membership functions, and two positive membership functions.

Very high, high, medium and low upshift values and very high, high, medium and low downshift values are stored in the inference engine. Fuzzy logic rules determine the degree to which each shift value is invoked, depending on the degree of membership of throttle position and acceleration in each rule. That is, the degree of truthfulness of each rule weights the shift value related to that rule. Then, the weighted shift values are combined into an upshift point and a downshift point which, with the turbine speed, forms the basis for a shift decision.

For example, a rule may state: "If throttle is small and acceleration is positive large, then upshift at low upshift point." This is interpreted by determining the degree of membership of throttle position in the small throttle membership function and the degree of membership of acceleration in the positive large acceleration membership class, and multiplying the low upshift point by the smaller of the two membership degrees. Thus, if the throttle membership is 0.5, the acceleration membership is 0.8, and the low upshift point is 1690 rpm, the rule result is the product 1690*0.5.

A standard center of gravity technique is used to combine the output of all the upshift rules. That is, the results of the rules are added and the total is divided by the sum of the invoked membership degrees. Thus, if another upshift rule for a high upshift membership function resulted in the product 2500*0.2, the final output value is [(1690*0.5)+(2500*0.2)]/(0.2+0.5)=1921 rpm for the upshift point.

BRIEF DESCRIPTION OF THE DRAWINGS

FIG. 1b is a diagram illustrating the clutch engagements required to establish the various speed ratios of the transmission depicted in FIG. 1a.

FIGS. 2, 3, 4 and 7, 8, 9, 10 and 11 are flow diagrams representative of computer program instructions executed by the computer based controller of FIG. 1a in carrying out the shift control according to the invention.

DESCRIPTION OF THE INVENTION

Figure 1A:
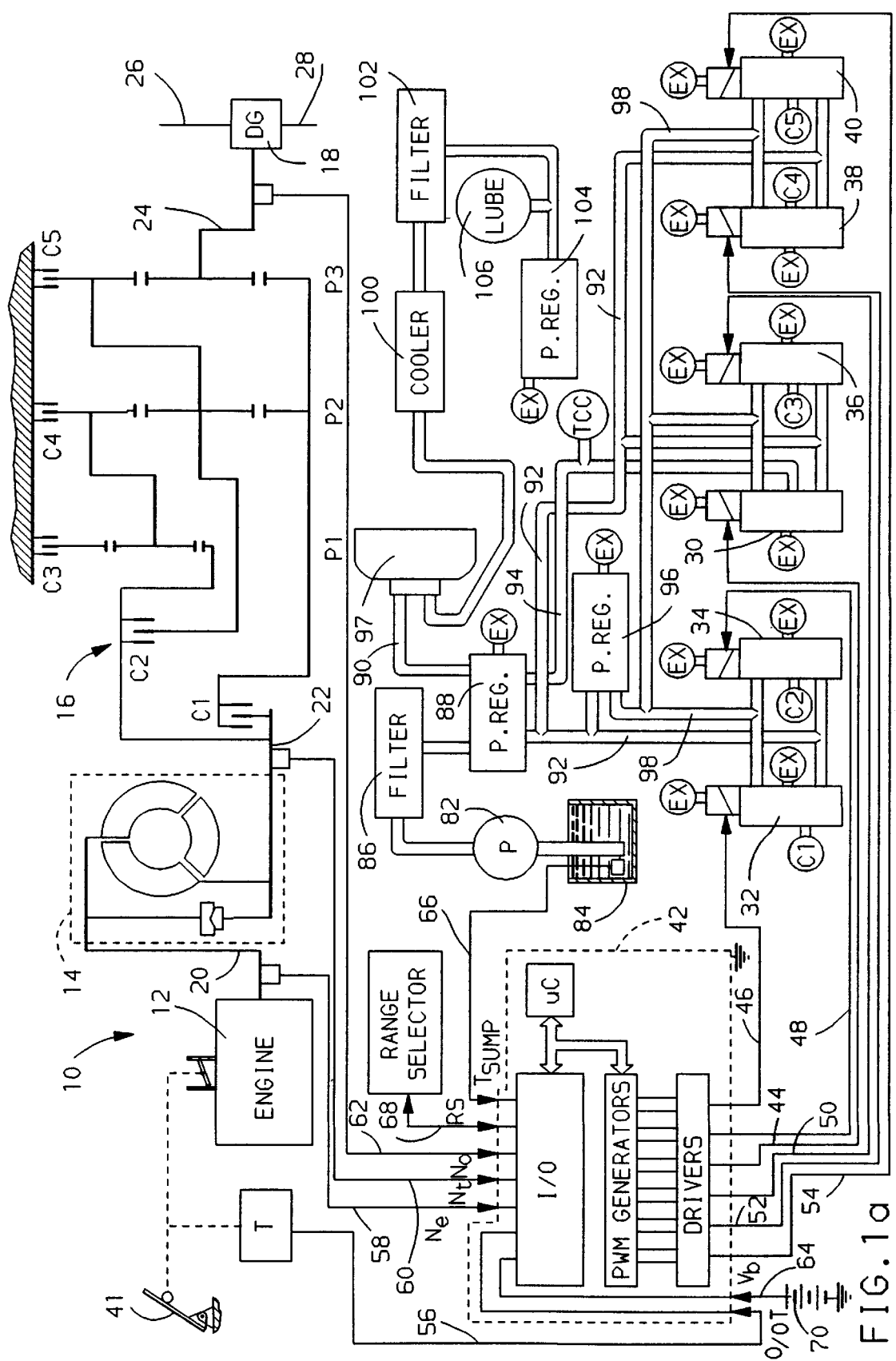
FIG. 1a is a system diagram of a fluid operated motor vehicle transmission, including several solenoid operated fluid pressure control valves, and a computer-based control unit for carrying out the control technique of this invention.

Referring now to the drawings, and more particularly to FIG. 1a, the reference numeral 10 generally designates a motor vehicle drive train including a throttled internal combustion engine 12, a fluidic torque converter 14, a six-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement require a fill time before torque is transmitted between a driving and a driven friction element.

The speed and torque relationships between the engine 12 and the drive wheels of the vehicle are controlled by a fluid operated torque converter lockup clutch, designated TCC, and five fluid operated transmission clutches, designated C1–C5. The torque converter clutch TCC is selectively engaged by the solenoid operated control valve 30 to mechanically connect the impeller I and turbine T of torque converter 14. The clutches TCC, C1, C2, C3, C4, C5 are selectively engaged and disengaged by the solenoid operated control valves 30, 32, 34, 36, 38, 40 according to the diagram shown in FIG. 1b, to selectively establish a desired transmission speed ratio. The illustrated transmission gear set provides one reverse ratio and six forward ratios, and is described in detail in the U.S. Pat. No. 4,070,927 to Polak, issued Jan. 31, 1978, and assigned to the assignee of the present invention. An operator manipulated accelerator pedal 41 positions the engine throttle for controlling the engine power output.

The operation of the solenoid operated control valves 30–40 is controlled by a computer-based control unit 42 via lines 44–54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/O) and an array of PWM generators (PWM) and drivers (DR). As indicated below, a PWM generator and a driver (DR) are dedicated to each solenoid control valve 30–40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1–C5 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30–40, and also to the control pressure regulator valve 96. The control pressure regulator valve 96 develops a somewhat lower pressure in line 98, referred to herein as the control pressure, such pressure being directed to the solenoid of each control valve 30–40. The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

Figures 1B, 2:
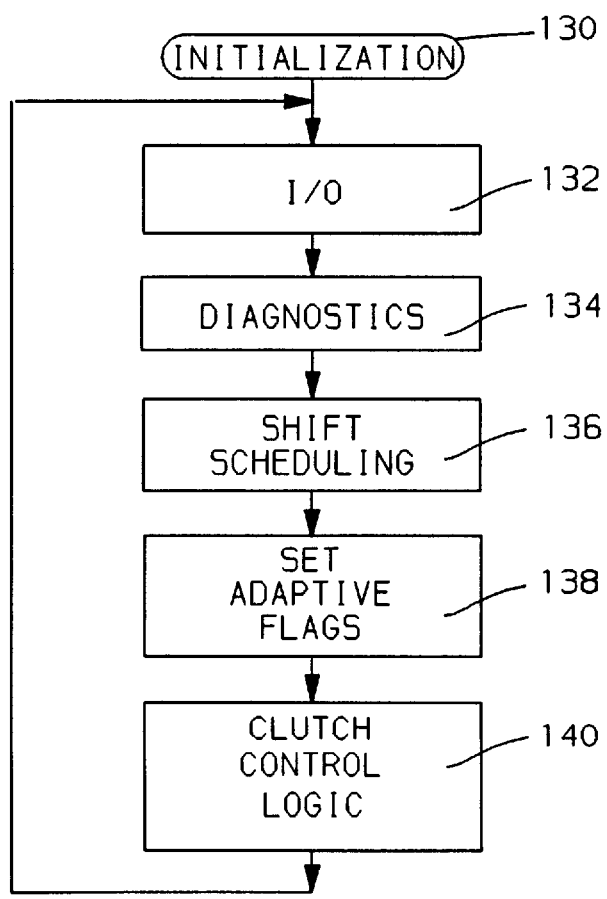

FIGS. 2, 3, 4, 7, 8, 9, 10 and 11 are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132–140 are sequentially and repeatedly executed as indicated by the flow diagram lines. Block 132 reads the various input signal values and outputs the required control signals to the PWM generators and drivers for solenoid controlled valves 30–40. Blocks 134–138 contain diagnostic, shift scheduling, and adaptive flag logic.

Figure 3:
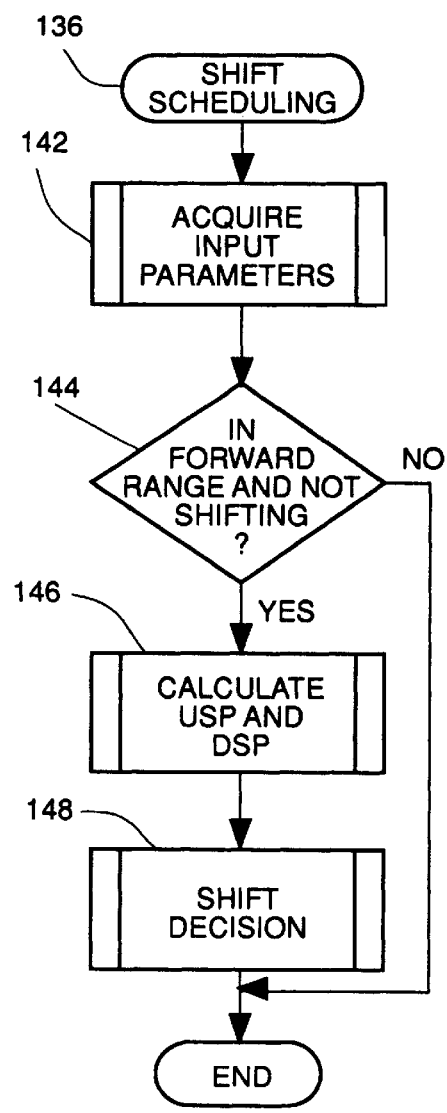

The shift scheduling routine 136 is shown in FIG. 3 and includes acquiring and processing input parameters <142>. If the transmission is in forward range and is not undergoing a range shift <144>, an upshift point (USP) and a downshift point (DSP) are calculated <146>. Then a shift decision is made <148> based on the shift points and the current turbine speed, and a shift initiation signal is issued. Lockup clutch control logic is incorporated in the shift decision block 148 and determines whether to produce a clutch apply or release signal. Then the control unit returns to the executive loop of FIG. 2.

The shift scheduling routine requires a number of calibration constants or other constants which are stored in the computer memory, as well as data generated during transmission operation. The latter comprises the identification of the current gear range N. Stored values include the gear ratio GR(N) for each gear range. The engine full load governed speed (GSP) must be entered into the memory. Other constants, which are required primarily for the lockup clutch control routine, include the Minimum Converter Speed Ratio for Release, the Minimum Converter Speed Ratio for Apply, the Minimum Engine Speed to Allow Lockup Operation, the Minimum Acceleration to Allow Lockup Operation, and the Lowest Allowable Lockup Range. The latter term is used to permit the lockup mode in any range except the range or ranges below the Lowest Allowable Lockup Range. Other information needed by the routine comprises the input parameters.

Figure 4:
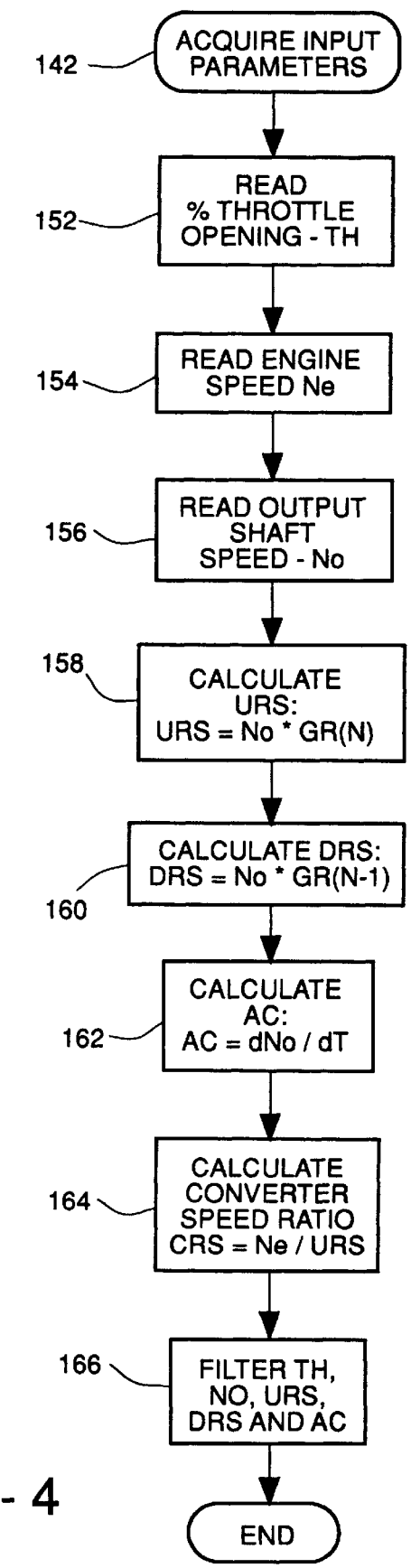

The routine 142 for acquiring input parameters is shown in FIG. 4. The throttle opening TH is read <152>, the engine speed Ne is read <154>, the transmission output shaft speed No is read <156>, and then the current upshift range speed URS (which is the turbine speed) is calculated as URS=No*GR(N) <158>. Next, the downshift range speed DRS is calculated as DRS=No*GR(N-1) <160>, which represents the projected turbine speed if a downshift were to occur. The acceleration AC is calculated as the time derivative of output speed No <162>, and the converter speed ratio CRS is calculated as CRS=Ne/URS <164>. Finally the parameters and their derivatives are digitally filtered <166>.

Figure 5:
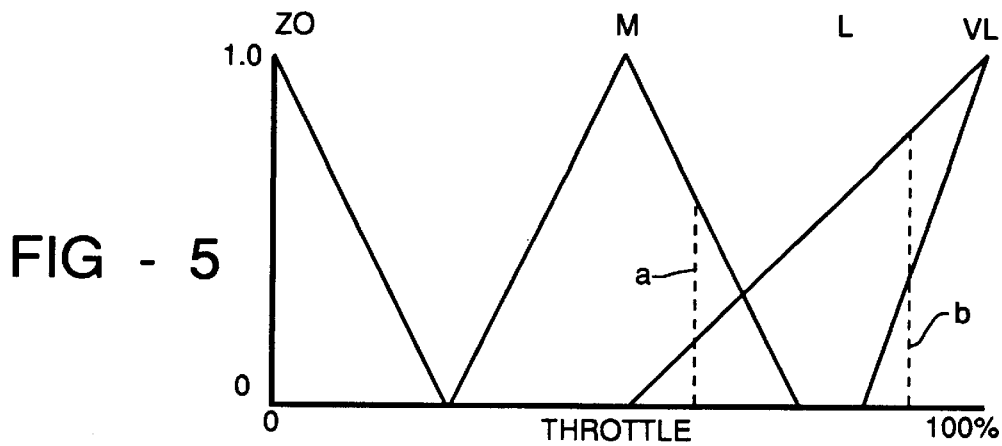
FIGS. 5 and 6 are graphical representations of throttle position and acceleration membership functions, respectively, for the fuzzy logic process according to the invention.

The inference engine of the system requires a set of membership functions for throttle position and another set for acceleration. The membership functions for throttle position, in percent throttle opening, are depicted in FIG. 5. A zero throttle position membership function ZO is defined by a straight line from 1 at 0% to 0 at 25%. A medium throttle membership function M is triangular, spanning from 25% to 75%, having a value of 0 at the end limits and a value of 1 at 50%. A large throttle position membership function L is defined by a straight line having a 0 value at 50% and 1 at 100%. This function overlaps the small function so that the throttle position can have membership in both classes.

The very large throttle position membership function VL extends from 0 at 85% opening to 1 at 100% and thus overlaps the large throttle position function. The degree of membership in any function depends on the throttle position. For example, if the throttle position is at 60%, as shown by the line a, the degree of membership in function M is 0.6 and in function L is 0.2. If the throttle position is at 90%, as shown by line b, the degree of membership in function L is 0.8 and in function VL is 0.3.

Figure 6:
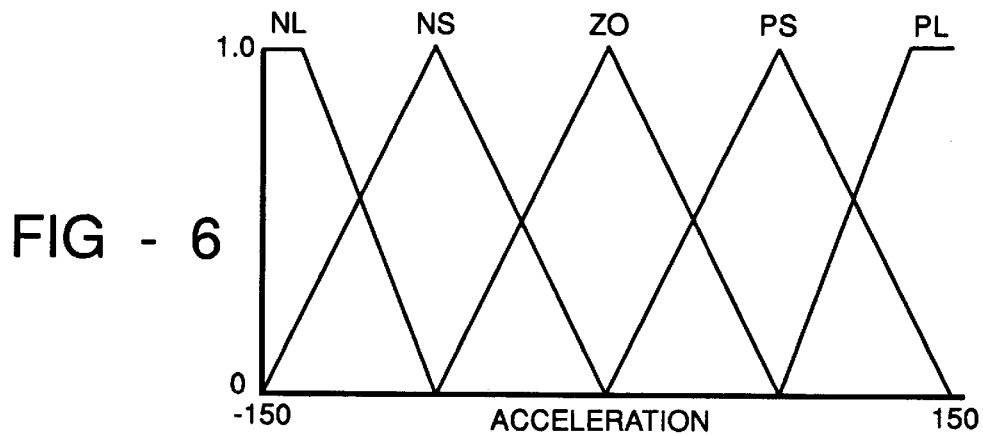

FIG. 6 shows the acceleration membership functions which comprise three triangular functions and straight line functions at the ends of the acceleration range. A triangular zero acceleration function ZO has a value of 1 at zero acceleration and zero at -75 and +75 rpm/sec, a positive small acceleration function PS has a value of 1 at 75 and zero at 0 and 150 rpm/sec.

A positive large acceleration function PL is zero at 75 rpm/sec and a value of 1 from 140 to 150 rpm/sec. A negative small acceleration function NS is 1 at -75 rpm/sec and zero at 0 and -150 rpm/sec, and a negative large acceleration function NL is zero the -75 and is 1 between -140 and -150 rpm/sec.

A set of shift point values are programmed into the computer. They all are defined as a percentage of full load engine governed speed (GSP). This allows the transmission to be applied to engines governed at different speeds, for example, 2100 rpm or 4000 rpm, by inputting only the correct GSP for the engine being used. If desired, more than one set of shift point values for normal mode, economy mode, etc., can be stored in the computer and selected by the driver via a control switch for the desired performance. A typical set of shift values for the normal and economy modes comprises:

|  | Normal | Economy |
| --- | --- | --- |
| very high upshift | vhusp 102% GSP | 95% GSP |
| high upshift | husp 96% GSP | 90% GSP |
| medium upshift | musp 85% GSP | 80% GSP |
| low upshift | lusp 60% GSP | 60% GSP |
| low downshift | ldsp 66% GSP | 66% GSP |
| high downshift | hdsp 88% GSP | 88% GSP |
| very high downshift | vhdsp 97% GSP | 97% GSP |

The fuzzy inference rules operate on selected ones of the upshift values in accordance with the membership degrees of the acceleration AC and throttle TH functions to calculate the shift points. The rules are as follows:

Upshift

1. If AC is PL and TH is M, then upshift at lusp.
2. If AC is PL and TH is L, then upshift at musp.
3. If AC is PS and TH is M, then upshift at lusp.
4. If AC is PS and TH is L, then upshift at husp.
5. If AC is ZO and TH is VL, then upshift at vhusp.

Downshift

6. If AC is ZO and TH is VL, then downshift at vhdsp.
7. If AC is NS and TH is ZO, then downshift at ldsp.
8. If AC is NS and Th is VL, then downshift at vhdsp.
9. If AC is NL and TH is ZO, then downshift at hdsp.
10. If AC is NL and TH is VL, then downshift at vhdsp.

Rules 5 and 6 are used respectively for shift inhibits and power downshifts for cases such as climbing steep grades where shift cycling might occur under normal shift schedule conditions. For all conditions not covered by the rules, an upshift limit of 125% GSP and a downshift limit of 60% GSP are stored for use as default shift points.

Figure 7:
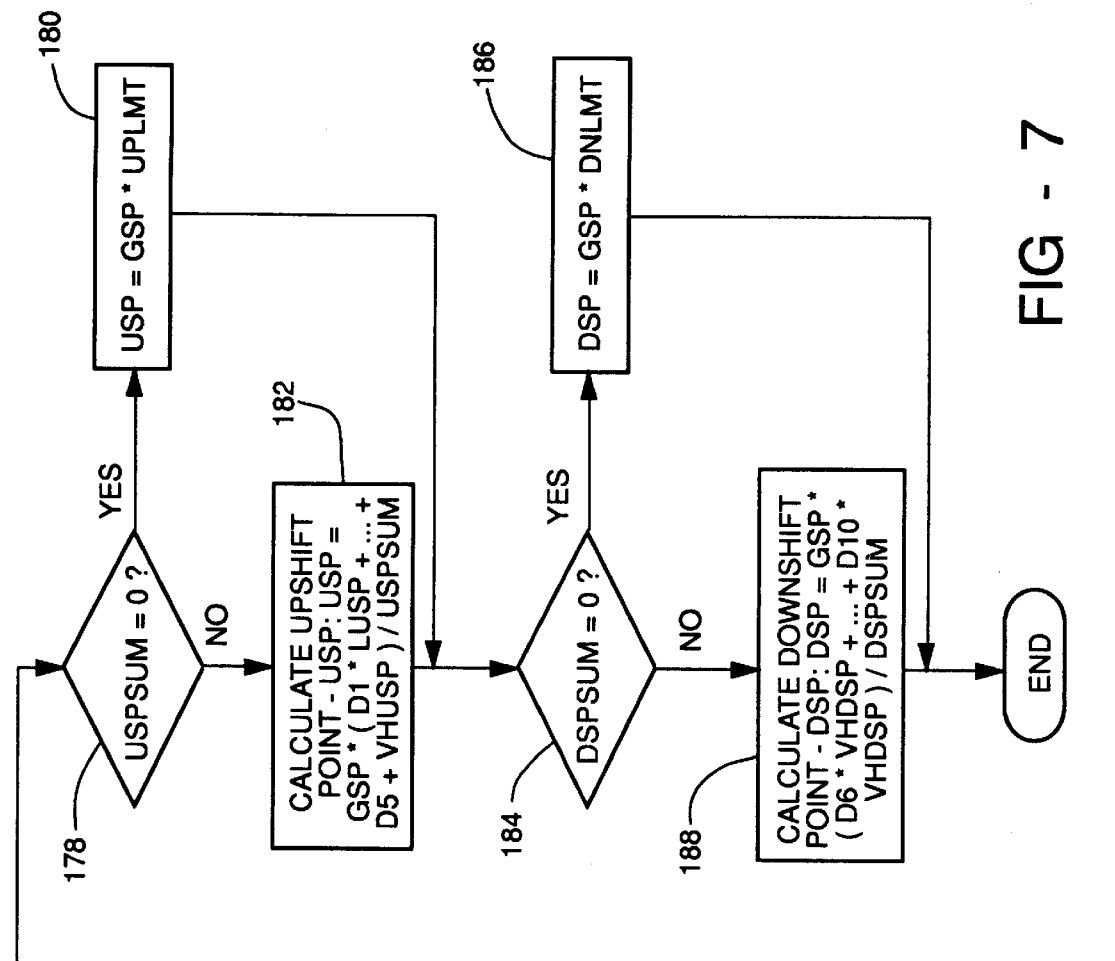
Figure 7:
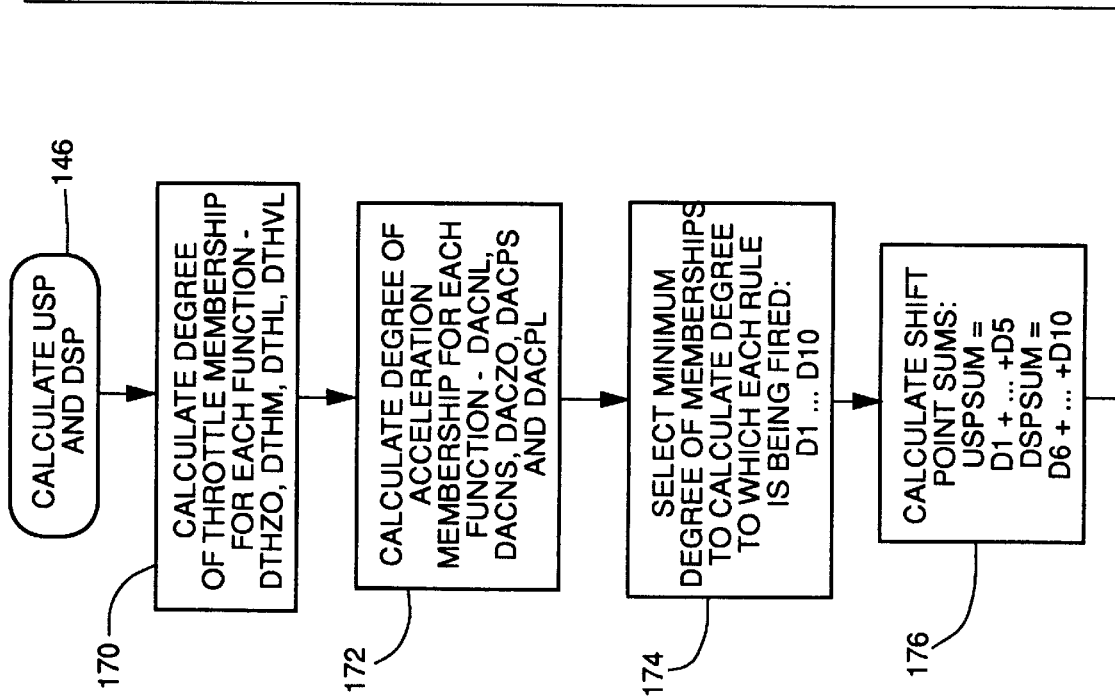

Given the above definitions of membership functions, shift point values and rules, the transmission shift points are calculated according to the flow chart of FIG. 7. The calculation routine 146 begins with calculating the degrees of throttle position membership for each function based on throttle position and the throttle membership definitions, where DTHZO means degree of membership in the zero throttle position membership function, etc. <170>.

Similarly, the degrees of membership in the acceleration functions are calculated based on acceleration and the function definitions <172>. The degree (D1, D2 ... D10) to which each rule is fired is determined by selecting the minimum AC or TH membership degree in each rule <174>. The sum USPSUM of the degrees of the upshift rules D1 ... D5 and the sum DSPSUM of the degrees of the downshift rules D6 ... D10 are calculated <176>.

If the upshift rule degree sums is zero <178>, the upshift point USP is set at the limit which is the product of GSP and UPLMT <180>. If USPSUM is not zero, the standard center of gravity method is used to calculate the upshift point <182>. That is, the degree of each rule D1 ... D5 is multiplied times its respective shift point value lusp, musp, etc., the products are summed, and the total is divided by USPSUM.

For downshift points, a similar method is used. If DSPSUM is zero <184> a limit value for DSP is calculated <186>. Otherwise the downshift point DSP is calculated by the standard center of gravity method <188>. Then the control unit proceeds to the shift decision block.

Figure 8:
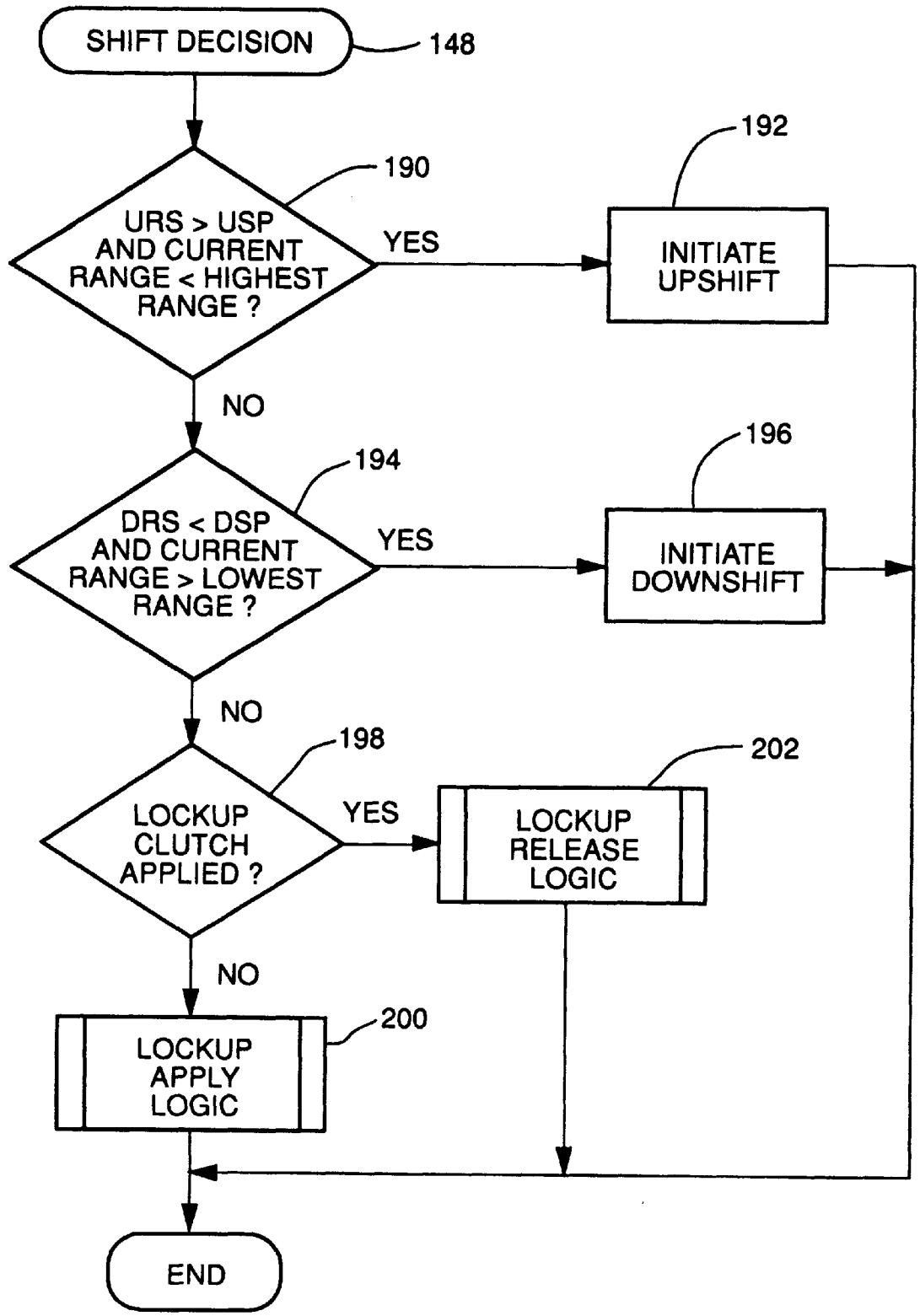

The shift decision logic routine 148 is shown in FIG. 8. If the upshift range speed URS (turbine speed) is greater than the calculated upshift point USP, and the current gear range is less than the highest range <190>, a signal is produced to initiate an upshift <192>. Otherwise, if the downshift range speed DRS is less than the downshift point DSP, and the current range is greater than the lowest range <194>, a signal is produced to initiate a downshift <196>. If block 194 is not true, and the lockup clutch is not applied <198>, the control unit proceeds to the lockup apply logic <200>. If the lockup clutch is applied, the control unit goes to the lockup release logic <202>.

Figure 10:
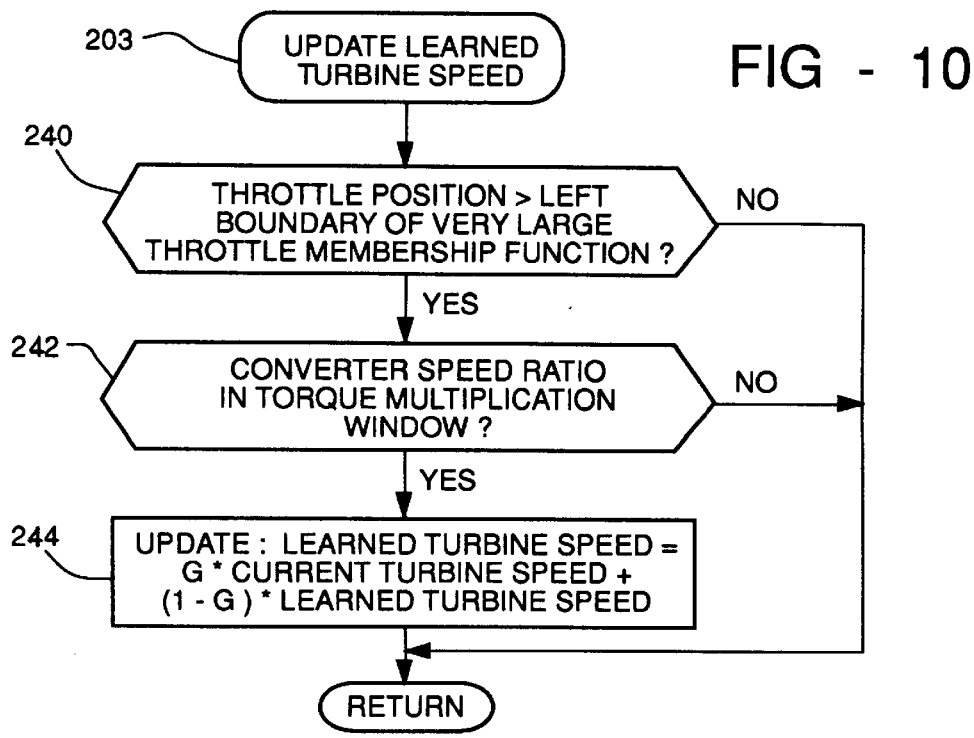
Figure 9:
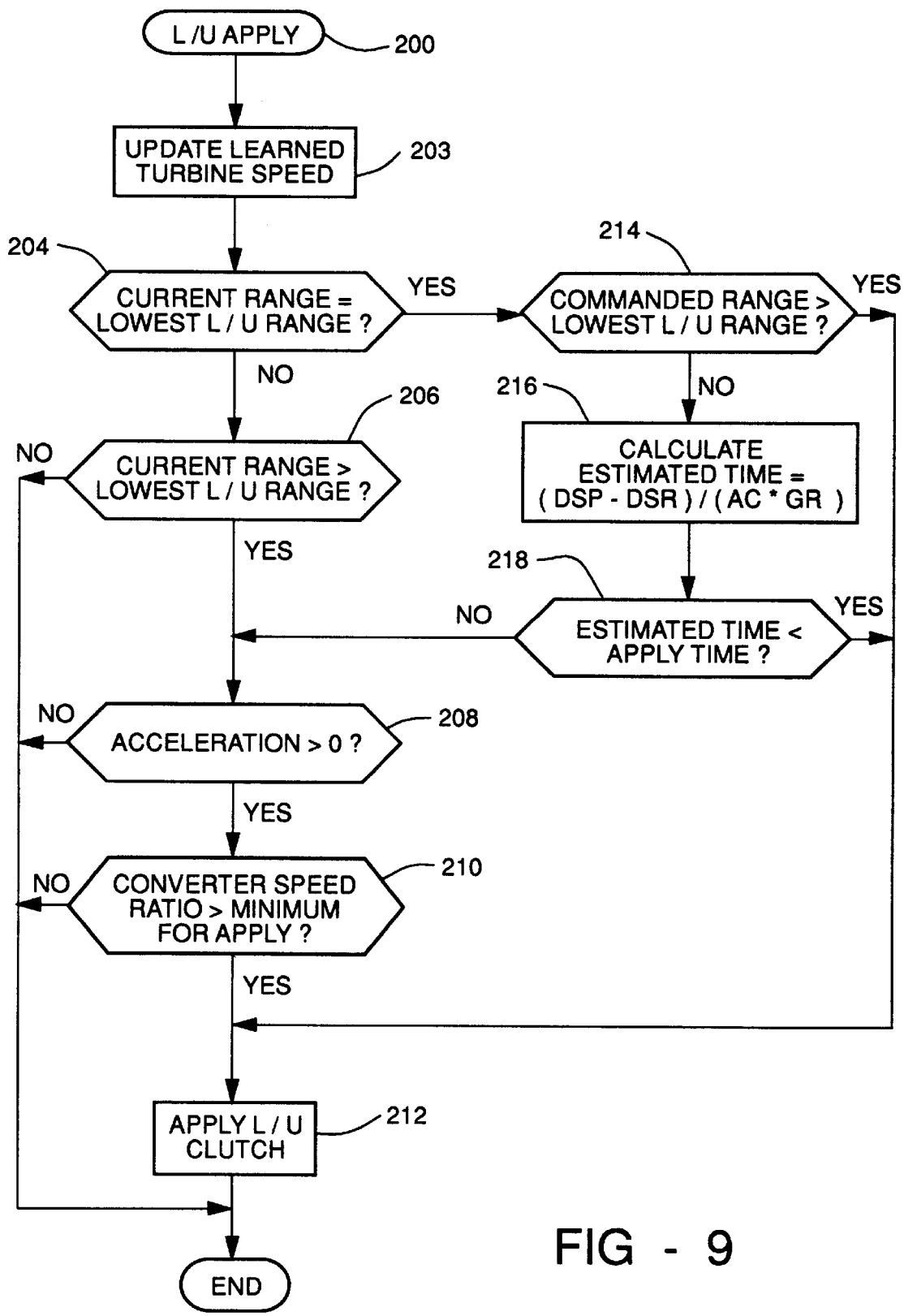
Figure 11:
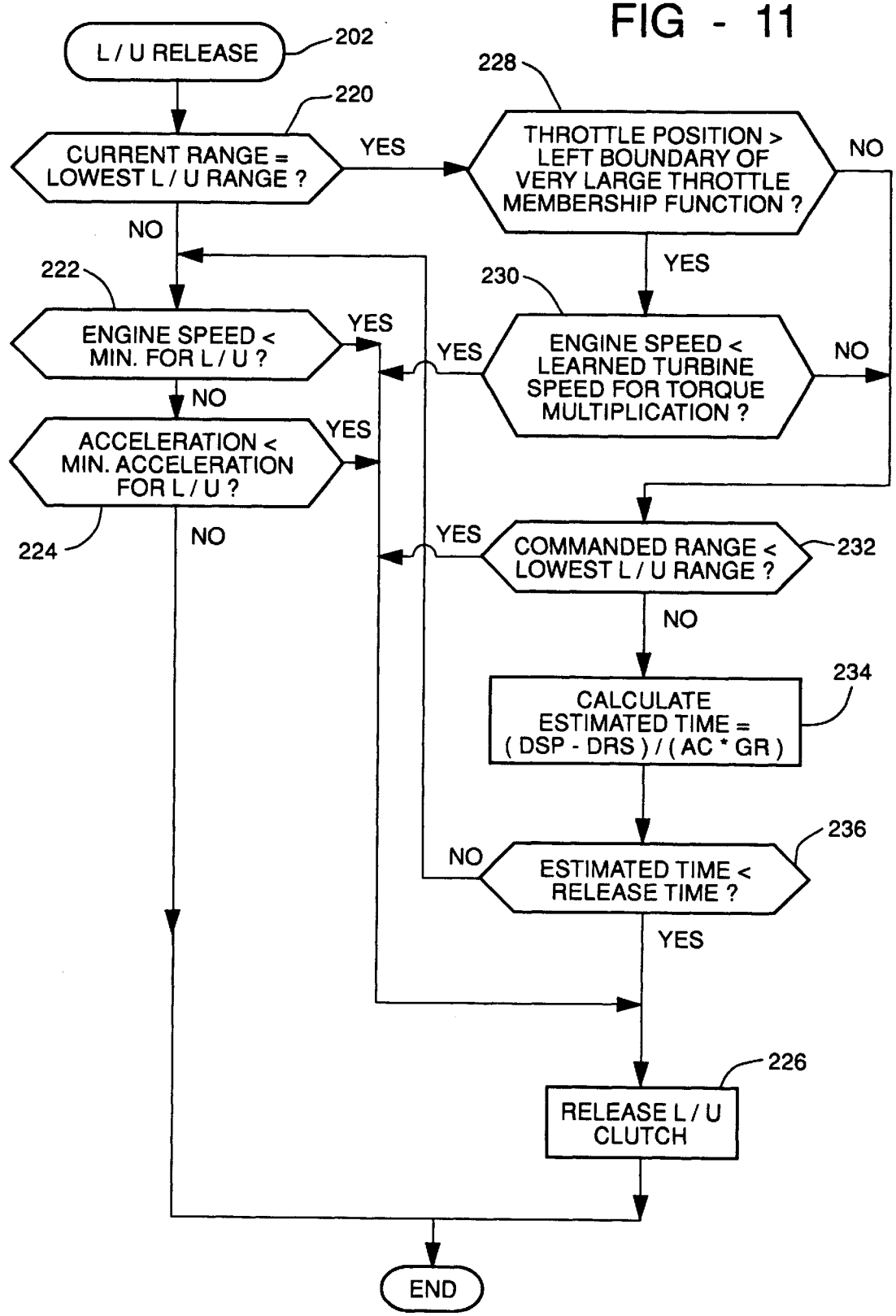

The lockup clutch control is divided into two main flow charts, FIGS. 9 and 11, for the lockup apply routine 200 and the lockup release routine 202, respectively, while FIG. 10 is an adjunct to FIG. 9. The objective of the lockup control is to maintain the transmission in converter mode when the converter is in the torque multiplication mode, as determined by the converter speed ratio, and to observe limits imposed by minimum speeds and accelerations, as well as by a lower limit on the ranges in which converter lockup is allowed. Generally, the lockup clutch is expected to apply in the lowest allowed range and remain on as it shifts through higher ranges, except in the case of low acceleration, low engine speed, or low converter speed ratio.

In FIG. 9, the first step is to update the learned turbine speed at which torque multiplication occurs for full throttle <203>, as fully explained with the flow chart of FIG. 10. Next, the apply routine 200 determines whether the current range is the lowest allowable lockup range <204>. If not, and the current range is greater than the lowest allowable lockup range <206>, and acceleration is greater than zero <208>, and the converter speed ratio is greater the minimum speed ratio required for apply <210> a lockup clutch apply signal is issued <212>. If any of the conditions of blocks 206, 208, and 210 are not met the apply routine 200 exits and the release program 202 begins.

If in block 204 it is determined that the current range is the lowest allowable lockup range, it is then determined whether the commanded range is a higher range, i.e. whether an upshift is initiated <214>. If so, a lockup apply signal is issued <212> and if not, the estimated time to a desired upshift is calculated <216> from the difference of the upshift point and the current range speed divided by the product of the acceleration and the current gear ratio. Then the estimated time to upshift is compared to the time required to apply the lockup clutch <218>. If the estimated time is less than the apply time the apply signal is issued, otherwise the control unit goes to block 208. The blocks 216 and 218 sense when an upshift is imminent and assures that the clutch applies in the lowest allowed lockup range.

For lockup clutch release, it is determined when the torque converter is in torque multiplication mode. One test of this, employed at nearly full throttle, is whether the engine speed is below a turbine speed at which torque multiplication occurs. That speed is adaptively learned, stored in non-volatile memory, and updated during the update block 203 of the apply routine as shown in FIG. 10. If the throttle position is greater than the left boundary of the very large throttle membership function <240> and the converter speed ratio is in a torque multiplication window <242>, the learned turbine speed is updated <244>.

The window is determined through calibration and may be, for example, a converter speed ratio range of 0.7 to 0.75. The learned turbine speed is computed by combining a percentage of the current turbine speed and a percentage of the previously learned turbine speed, as shown in block 244 where G is a gain between 0 and 1.

In FIG. 11, the lockup clutch release routine 202 determines whether the current range is the lowest allowable lockup range <220>. If not, and the engine speed is less than the minimum required for lockup operation <222> or the acceleration is less than the minimum required for lockup operation <224> a lockup clutch release signal is issued <226>. When the current range is equal to the lowest allowable lockup range <220>, if the throttle position is greater than the left boundary of the very large throttle membership function <228> and the engine speed is less than the learned turbine speed from block 203 for torque multiplication <230>, the clutch release signal is produced <226>.

If the conditions in either block 228 or 230 are not met, it is determined whether the commanded range is lower than the lowest lockup allowed lockup range <232>. If so, the release signal is produced <226> and, if not, the estimated time to a desired downshift is calculated <234> from the difference of the downshift point and the downshift range speed divided by the product of the acceleration and the current gear ratio. Then the estimated time to downshift is compared to the time require to release the lockup clutch <236>. If the estimated time is less than the release time, the release signal is issued, otherwise the control unit goes to block 222. The blocks 234 and 236 sense when a downshift is imminent and assures that the clutch releases while still in the lowest allowed lockup range.

It will thus be appreciated that the invention accomplishes the goals of using fuzzy logic responsive to transmission output speed, acceleration derived from the speed, and throttle position to set shift points, thereby scheduling range shifts in accordance with programmed optimum shift considerations, as well as with the driver's intentions as reflected in throttle position.

The driver additionally has the ability to select a normal or economy shift mode. The invention also includes the ability to control a converter lockup clutch, partly on the basis of a shift point determined by fuzzy inference. Both the shift scheduling and the lockup clutch control use parameters based on governed engine speed so that a transmission controlled according to the invention can be used with different engines by entering the specific governed speed into the control memory.

The embodiments of the invention in which an exclusive property or privilege is claimed are defined as follows:

1. The method of producing shift signals in an automatic transmission driven by an engine having a governed speed, comprising the steps of:

acquiring transmission output speed and throttle position signals:

deriving an acceleration value from the output speed;

setting a plurality of upshift values and downshift values which are fixed percentages of the governed speed;

establishing membership functions for positive and negative acceleration and for throttle position;

determining the degree of membership in each membership function for current acceleration and throttle position values;

weighting upshift values and downshift values according to rules employing the degree of membership in selected membership functions;

calculating shift points in accordance with said weighted values; and producing a shift signal in accordance with the relation of the speed signal to said shift points by calculating the transmission input speed from the output speed and gear ratio, and comparing the calculated input speed to the upshift and downshift points.

2. The method of producing shift signals in an automatic transmission driven by an engine having a governed speed, comprising the steps of:

acquiring transmission output speed and throttle position signals;

deriving an acceleration value from the output speed;

setting a plurality of upshift values and downshift values which are fixed percentages of the governed speed;

establishing membership functions for positive and negative acceleration and for throttle position;

determining the degree of membership in each membership function for current acceleration and throttle position values;

weighting upshift values and downshift values according to rules employing the degree of membership in selected membership functions;

calculating shift points in accordance with said weighted values; and producing a shift signal in accordance with the relation of the speed signal to said shift points by calculating an upshift range speed from the output speed and the current gear ratio and producing an upshift signal when the upshift range speed is greater than the upshift point; and calculating a downshift range speed from the output speed and the gear ratio for the next lower range, and producing a down shift signal when the downshift range speed is less than the downshift point.

3. The method of producing shift signals in an automatic transmission driven by an engine having a governed speed, comprising the steps of:

acquiring transmission output speed and throttle position signals:

deriving an acceleration value from the output speed;

setting a plurality of upshift values and downshift values which are fixed percentages of the governed speed;

storing sets of upshift and downshift values for at least two different modes of operation;

selecting a set of said values for a desired mode of operation;

establishing membership functions for positive and negative acceleration and for throttle position;

determining the degree of membership in each membership function for current acceleration and throttle position values;

weighting upshift values and downshift values according to rules employing the degree of membership in selected membership functions;

calculating shift points in accordance with said weighted values; and producing a shift signal in accordance with the relation of the speed signal to said shift points.

4. In an automatic transmission having a torque converter and a lockup clutch, the method of producing shift signals using fuzzy inference and for controlling the lockup clutch by producing apply and release signals comprising the steps of:

acquiring transmission output speed and throttle position signals;

deriving an acceleration value from the output speed;

setting a plurality of upshift values and downshift values;

establishing membership functions for positive and negative acceleration and for throttle position;

determining the degree of membership in each membership function for current acceleration and throttle position values;

weighing upshift values and down shift values according to rules employing the degree of membership in selected membership functions;

calculating shift points in accordance with said weighted values;

producing a shift signal in accordance with the relation of the speed signal to the calculated shift points;

controlling the lockup clutch by determining whether torque multiplication is being produced by the converter on the basis of engine speed, output speed and acceleration, controlling the lockup clutch on in the absence of such multiplication and controlling the lockup clutch off when multiplication occurs, and producing a clutch release signal when the current transmission range is equal to the lowest allowable range for lockup and the throttle position has a given relationship to one of the throttle position membership functions and the engine speed is less than a learned turbine speed calculated when the throttle position is in the range of a very large throttle position membership function and the converter speed ratio is in a calibrated torque multiplication window, and the learned turbine speed is equal to a percentage of the current turbine speed combined with a percentage of the previous learned turbine speed, the sum of the percentages being 100 percent.

5. In an automatic transmission having a torque converter and a lockup clutch, the method of producing shift signals using fuzzy inference and for controlling the lockup clutch by producing apply and release signals comprising the steps of:

acquiring transmission output speed and throttle position signals;

deriving an acceleration value from the output speed;

setting a plurality of upshift values and downshift values;

establishing membership functions for positive and negative acceleration and for throttle position;

determining the degree of membership in each membership function for current acceleration and throttle position values;

weighing upshift values and down shift values according to rules employing the degree of membership in selected membership functions;

calculating shift points in accordance with said weighted values;

producing a shift signal in accordance with the relation of the speed signal to the calculated shift points;

controlling the lockup clutch by determining whether torque multiplication is being produced by the converter on the basis of engine speed output speed, and acceleration, controlling the lockup clutch on in the absence of such multiplication and controlling the lockup clutch off when multiplication occurs, and producing a clutch release signal when the current transmission range is equal to the lowest allowable range for lockup, the throttle position is at nearly full throttle, and the engine speed is less than a learned turbine speed;

and wherein the learned turbine speed is calculated when the throttle is at nearly full throttle and the converter speed ratio is in a calibrated torque multiplication window, and is updated by summing weighted values of the current turbine speed and a previously learned turbine speed.

* * * * *